US007882368B2

(12) United States Patent
Alessi et al.

(10) Patent No.: US 7,882,368 B2
(45) Date of Patent: *Feb. 1, 2011

(54) SYSTEM FOR PUBLISHING CONTENT ON A PORTABLE DIGITAL STORAGE MEDIUM

(75) Inventors: Mark A. Alessi, Odessa, FL (US); Alberto Gabriel Mendoza Padial, Tampa, FL (US); H L Courtland Whited, Tampa, FL (US); Jennifer Phelan Hernandez, Tampa, FL (US); James A. Stikeleather, Tampa, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,065

(22) Filed: Jun. 1, 2009

(65) Prior Publication Data
US 2009/0232305 A1 Sep. 17, 2009

Related U.S. Application Data

(63) Continuation of application No. 10/386,121, filed on Mar. 11, 2003, now Pat. No. 7,545,940, which is a continuation-in-part of application No. 10/342,159, filed on Jan. 14, 2003.

(60) Provisional application No. 60/439,843, filed on Jan. 14, 2003, provisional application No. 60/400,508, filed on Aug. 2, 2002.

(51) Int. Cl.
*G06F 12/14* (2006.01)
*G06Q 30/00* (2006.01)
*G06F 15/16* (2006.01)
*H04L 9/08* (2006.01)

(52) U.S. Cl. .................... 713/193; 705/14.37; 709/231; 380/282

(58) Field of Classification Search .............. 705/14.37; 713/193; 709/231; 380/282
See application file for complete search history.

(56) References Cited

U.S. PATENT DOCUMENTS

| 4,757,534 | A  | * | 7/1988 | Matyas et al. ................. 705/56 |
| 5,857,021 | A  | * | 1/1999 | Kataoka et al. ............... 705/54 |
| 5,995,625 | A  | * | 11/1999 | Sudia et al. .................... 705/51 |
| 6,177,931 | B1 | * | 1/2001 | Alexander et al. ............ 725/52 |
| 6,331,867 | B1 | * | 12/2001 | Eberhard et al. ............ 715/864 |
| 6,611,812 | B2 | * | 8/2003 | Hurtado et al. ............... 705/26 |
| 6,687,683 | B1 | * | 2/2004 | Harada et al. ................. 705/51 |

(Continued)

*Primary Examiner*—William R Korzuch
*Assistant Examiner*—Trang Doan
(74) *Attorney, Agent, or Firm*—Ference & Associates LLC

(57) ABSTRACT

In a method of publishing creative content to at least one local digital display device, a first unit of the creative content is stored on a first portable digital storage medium in an encrypted format. The digital replication is encrypted with a selected one of a plurality of private encryption keys. The first portable digital storage medium is transferred to the local digital display device. A preselected public key is entered into the local digital display device. The preselected public key corresponds to the selected one of the plurality of private encryption keys. At least a portion of the first unit of the creative content is decrypted by employing the public encryption key using a public key/private key decryption algorithm. The portion of the creative content is displayed on the local digital display device.

9 Claims, 13 Drawing Sheets

U.S. PATENT DOCUMENTS

| | | | |
|---|---|---|---|
| 6,901,385 B2 * | 5/2005 | Okamoto et al. | 705/51 |
| 7,298,851 B1 * | 11/2007 | Hendricks et al. | 380/282 |
| 2001/0029583 A1 * | 10/2001 | Palatov et al. | 713/193 |
| 2002/0062439 A1 * | 5/2002 | Cotugno et al. | 713/170 |
| 2003/0158813 A1 * | 8/2003 | Vidich et al. | 705/50 |

* cited by examiner

SYSTEM FOR PUBLISHING CONTENT ON A PORTABLE DIGITAL STORAGE MEDIUM

CROSS-REFERENCE TO A RELATED PATENT APPLICATIONS

This application claims priority to and is a continuation of U.S. patent application Ser. No. 10/386,121 now U.S. Pat. No. 7,545,940, entitled "System For Publishing Content on a Portable Digital Storage Medium," filed on Mar. 11, 2003, which is a continuation-in-part of U.S. patent application Ser. No. 10/341,159, filed Jan. 14, 2003, and which claims priority to U.S. Provisional Patent Application No. 60/439,843, filed Jan. 14, 2003, and to U.S. Provisional Patent Application No. 60/400,508, filed Aug. 2, 2002, the contents of each of the above-listed applications being hereby incorporated by reference in their entireties.

BACKGROUND OF THE INVENTION

1. Field of the Invention

The present invention relates to publication of media and, more specifically, to a method for publishing media in a portable digital format.

2. Description of the Prior Art

With the development of the Internet, many types of creative content have become accessible to users by downloading. Such creative content includes everything from streaming videos and music to text. Entire books may be downloaded, these include graphic novels and comic books. Most online services allow a user to download the content onto the user's personal computer (PC), but do not provide for portable use of the content.

Portable use of digital content is made more difficult by the variety of digital display devices on which the content may be displayed. For example, the content may be displayed on a tablet PC, a personal data assistant (PDA), or a laptop PC. Each of these devices may operate under a completely different operating system. Therefore, a single download of content might not be usable on the majority of devices.

Currently, distribution of digital content requires that the user have a network-connected PC on which to download content. Some users, such as those of graphic novels, might want to be able to purchase the content while away from a PC. For example, many comic book readers make their comic purchasing decisions at a comic store, often at a mall. There is no currently available method of marketing downloaded digital creative content to users at a mall.

Therefore, there is a need for a system that allows downloading of digital content to a portable digital storage device, for use on a digital display device.

SUMMARY OF THE INVENTION

The disadvantages of the prior art are overcome by the present invention which, in one aspect, is a method for displaying an illustrated book on a computer screen, in which a graphics image, corresponding to a page in the illustrated book, is displayed on the computer screen. A text detail image is displayed on the computer screen. The text detail image is displayed as a layer on the top of the graphics image. A cursor rolling over the text detail image is detected, A magnified image of the text detail image is displayed when the cursor has rolled over the text detail image.

In another aspect, the invention is a method for displaying a book on a computer screen, in which a first graphics image, corresponding to a first page in the book, is displayed on the computer screen. A text detail image is displayed on the computer screen. The text detail image is displayed as a layer on the top of the first graphics image. A portion of an audio file corresponding to the text detail image in the first page of the book is played on an audio device. The audio file is a narrative of the book.

In another aspect, the invention is a method for displaying a serial comic book on a computer screen, in which a comics image about the comics story is displayed on the computer screen. A summary feature button along the comics image is on the computer screen and a summary of the comics story up to the comics image is displayed upon detecting activation of the summary feature button.

In another aspect, the invention is a method for displaying a comic book on a computer screen in which a comics image about the comics story is displayed on the computer screen. A biography feature button along the comics image is displayed on the computer screen. Activation the biography feature button is detected. Biographies of characters in the comics story are displayed when the biography feature button is activated.

In yet another aspect, the invention is a method for displaying a comic book, including a predetermined number of pages, on a computer that is in communication with a global computer network that is in communication with a server. A first selected number of pages, having a first page and a last page, of the predetermined number of pages is downloaded from the server to the computer. The first selected number is less than the predetermined number. The first selected number of pages is displayed in sequence from the first page to the last page. A second selected number of pages of the predetermined number of pages is downloaded from the server when a page of the first selected number of pages within a predetermined range of the last page of the first selected number of pages has been displayed.

The invention introduces a system and methods for publishing digital information using a computing device in communication with a computer network. The digital information resides on a storage device on the computer network and is downloaded to the computing device as it is needed for displaying. Optionally, the digital information may be loaded from a compact disk read only memory disk (CD ROM). The digital information is separated into different files and they can be displayed separately.

In one aspect, the digital information is a comic book. The comic book is displayed on a display screen sequentially, page by page. The comic book is downloaded sequentially from the storage device. The digital information for each display page is separated into different files, and these files can be displayed independently from other files. For example, the user can select to view the comic book in black and white display, and the system will not display the color file. If the user selects to view in color, then the color file will be displayed on the top of the black and white image.

The dialogs are displayed in traditional dialog balloons. These dialog balloons can be enlarged for easy reading by simply placing a cursor on the top of selected dialog balloons. The enlargement of the selected balloon does not affect the underlined graphics display. The user can modify the size of dialog balloons and the speed that a dialog balloon changes its appearance. The user can also select to have dialogs displayed in the audio format, and the system will "read" out loud the selected dialog on a speaker. The user can select the volume that a dialog is played by the speaker, and the user can optionally change the selected dialog to a different language.

The user needs not to read the comic story sequentially; the user can jump to any page. After jumping to a particular page, the user can learn about the story up to that point by using the "story up to this point" feature. The system also provides a synopsis feature, so the user can have a general idea about the comic story. The user can also learn about each individual character in the story by using the character's biographical information feature. The user can also learn about the creators of the comic story by using the credit feature and the information about the creators will be displayed.

In yet anther aspect, the invention is a method of publishing creative content to at least one local digital display device. A first unit of the creative content is stored on a first portable digital storage medium in an encrypted format, the first unit is encrypted with a selected one of a plurality of private encryption keys. The first portable digital storage medium is transferred to the local digital display device. A preselected public key is entered into the local digital display device. The preselected public key corresponds to the selected one of the plurality of private encryption keys. At least a portion of the first unit of the creative content is decrypted by employing the public encryption key using a public key/private key decryption algorithm. The portion of the creative content is displayed on the local digital display device.

In yet another aspect, the invention is a method of verifying authenticity of content stored on a portable digital storage medium. A profile mapping the portable digital storage medium indicates that at least one preselected unit of memory is inaccessible. The preselected unit of memory stores data necessary for using the content. The data necessary for using the content is retrieved from the preselected unit of memory. Access to the content is allowed only when the data necessary for using the content is present in the preselected unit of memory.

In yet another aspect, the invention is a method of limiting access to data on a portable data storage medium. A hashing index is generated and the data is hashed using a hashing algorithm employing the hashing index, thereby generating hashed data. The hashing index is encrypted, thereby generating an encrypted hashing index. The hashed data and the encrypted hashing index are stored on the portable data storage medium. The portable data storage medium and a key to decrypt the encrypted hashing index are delivered to a user. The user may gain access to the data by inputting the key into a program for decrypting the encrypted hashing index and then de-hashing the data.

In yet another aspect, the invention is a method of distributing creative content for use on a local digital display device. A digital representation of the creative content is transmitted from a server to a kiosk system via a global computer network. The digital representation is encrypted with a private key. A public key, corresponding to the private key, is transmitted from the server to the kiosk system via the global computer network. Upon receiving the digital representation from the global computer network at the kiosk, a portable digital storage medium is delivered to a portable digital storage medium duplicator and the digital representation is stored on the portable digital storage medium with the portable digital storage medium duplicator. The portable digital storage medium is delivered to a printer and the public key is printed on an exterior surface of the portable digital storage medium. The portable digital storage medium is delivered to a user.

In yet another aspect, the invention is a portable digital storage medium for use with a local digital display device, comprising a data set stored thereon. The data set includes a plurality of digital replications of a creative content. Each replication conforms to a different operating system. Upon insertion of the portable digital storage medium to the local digital display device, a wrapper program determines which operating system is employed by the local digital display device and directs a replication conforming to the operating system employed by the local digital display device to be played on the local digital display device.

Each digital replication is encrypted using a public key/private key decryption algorithm, in which a predetermined public key may be used to decrypt the digital replication. The portable digital storage medium has an exterior surface and the predetermined public key is printed on the exterior surface. The portable digital storage medium may include a solid state portable digital storage medium.

In yet another aspect, the invention is a portable digital storage medium distribution kiosk. The kiosk includes a user interface, a printer, a portable digital storage medium writing device, a portable digital storage medium supply and a processor. The printer is capable of printing character data on a portable digital storage medium. The portable digital storage medium writing device is capable of writing data to a portable digital storage medium and capable of delivering a portable digital storage medium to the printer. The portable digital storage medium supply is capable of delivering a portable digital storage medium to the portable digital storage medium writing device. The processor includes a memory and is in data communication with the user interface and a global computer network, the printer the portable digital storage medium writing device and the portable digital storage medium supply. The processor is programmed to execute the following steps: upon receipt of a preselected user input from the user interface, transmit a request for data, including a content portion and a public key portion, to a server communicating with the global computer network; upon receipt of the data requested from the server, store the data in the memory and instruct the portable digital storage medium supply to deliver a portable digital storage medium to the portable digital storage medium writing device; upon receipt of an indication that the portable digital storage medium has been delivered to the portable digital storage medium writing device, cause the portable digital storage medium writing device to store the content portion of the data on the portable digital storage medium and then deliver the portable digital storage medium to the printer; and upon receipt of an indication that the portable digital storage medium has been delivered to the printer, instruct the printer to print characters corresponding to the public key portion of the data onto an external surface of the portable digital storage medium and cause the printer to eject the portable digital storage medium to a user once the characters are printed on the external surface.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
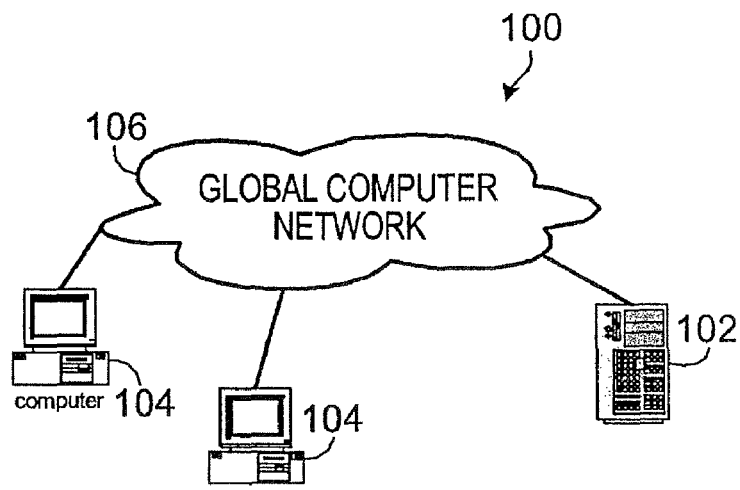
FIG. 1 is a block diagram showing a network architecture that would support one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now in detail to the figures, where like numerals refer to like elements throughout the several views, FIG. 1 depicts architecture 100 of a network supporting the present invention. In one embodiment, the invention is a mechanism for displaying a comic book via the global computer network. The digital information for publishing the comic book is stored in a server 102 in communication with the global computer network 106. The server 102 may be a dedicated computer, and the global computer network 106 may be a high-speed data network, such as the Internet. The digital information can be downloaded via the computer network 106 to an end user's computers 104 in response to a request received from the end user.

Figure 2:
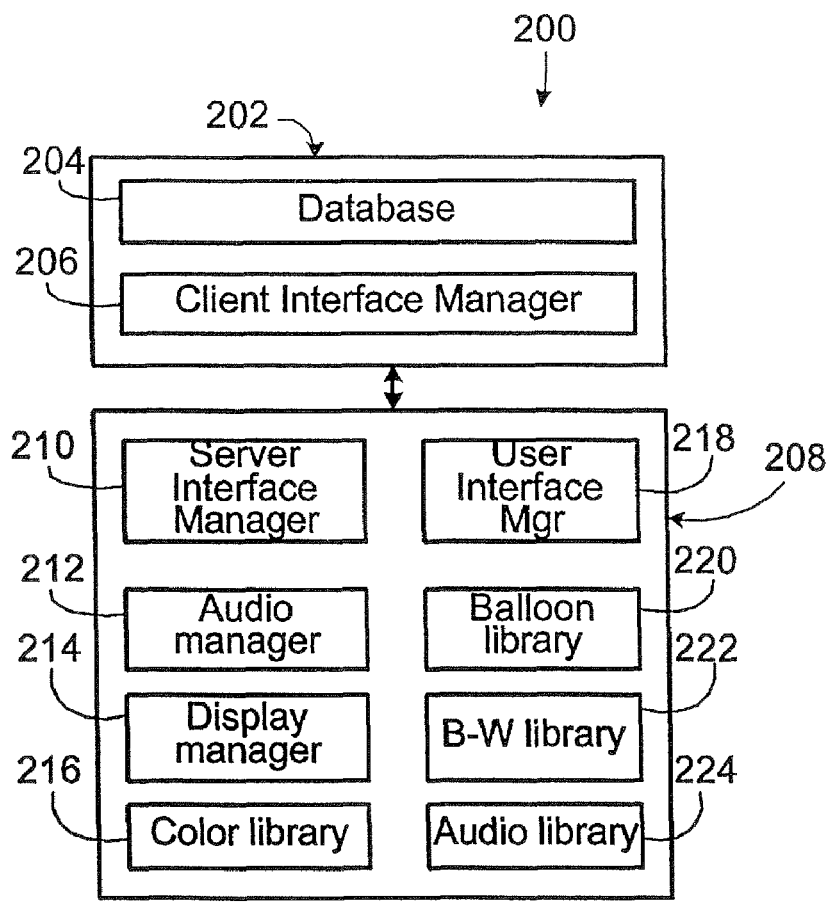
FIG. 2 is a block diagram showing server and client interface management in one embodiment of the invention.

FIG. 2 illustrates an architecture 200 of an exemplary embodiment. The digital information publishing system of the invention may be architected in a client-server configuration. The server component 202 has a client interface manager 206 and a database 204 of digital information. The client component 208 has a server interface manager 210, an audio manager 212, a display manager 214, a user interface manager 218, a color library 216, a balloon library 220, a black-and-white library 222, and an audio library 224.

The server component 202 resides generally on the server 102. The database 204 is stored in a memory device on the server 102, and the client interface manager 206 is a software program running on the server 102. The client interface manager 206 interfaces with the client component 208 that may be running on a remote computer.

The client component 208 is usually downloaded from the server 102 to a client computer 104 located remotely. The client component 208 runs on the client computer 104 and communicates with the server component 202 through the server interface manager 210 via data messages or other suitable communications means. The server interface manager 210 makes requests for information to the server component 202 and stores the information received in proper libraries. The audio manager 212 is responsible for retrieving audio files from the audio library 224 and playing them on audio devices. The display manager 214 is responsible for retrieving graphic files and displaying them on a display device. The graphic files are stored, depending on their nature, in the black-and-white library 222, the color library 216, on the balloon library 220. The balloon library 220 is also known as detail information library.

In an alternate embodiment, the digital publishing system may be a one single piece of software running on a single computer. The digital publishing system may be stored in a computer readable disk and loadable onto the computer memory.

Figure 3:
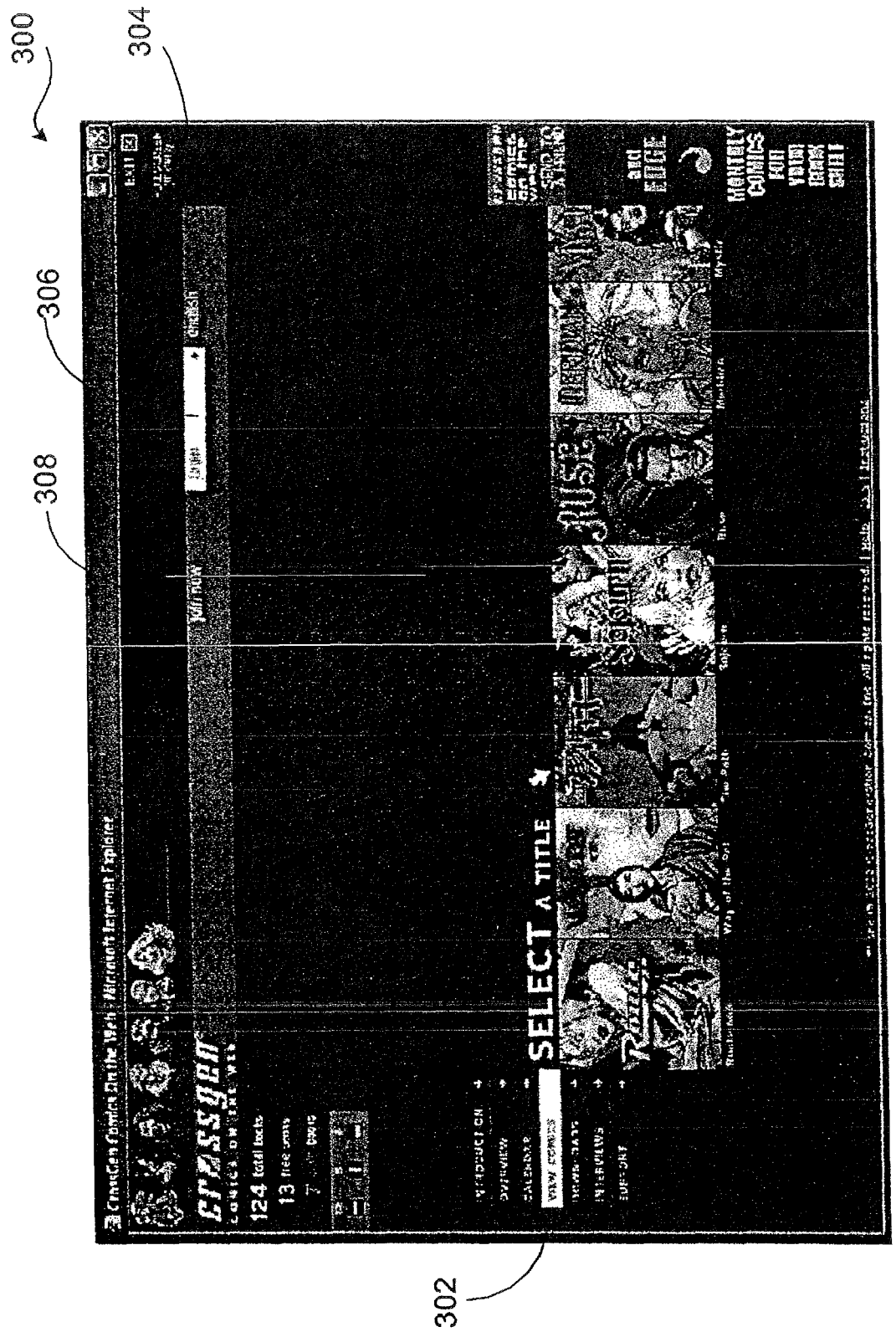
FIG. 3 shows an initial screen displayed in one embodiment of the invention.

According to one embodiment, the invention employs a display screen to present the digital information to a user. FIG. 3 illustrates an initial screen 300 displayed to the user. When the user starts the program by either invoking the software on a computer or by visiting a web site, the initial display screen 300 is displayed to the user. The initial display screen 300 has an action menu 302, from where the user can enter his desired action. The initial display screen 300 has also a tool bar across a portion of the screen. The tool bar has a language button 304 that allows the user to choose the language for the action menu 302. The tool bar also has a login button 306 for the user to login if the user is a regular subscriber. If the user is not a regular subscriber, he can subscribe the service using the subscription ("join now") button 308.

When the user selects "view comics" button from the action menu 302, a list of available titles is displayed across the display screen. By moving a cursor horizontally across the display screen, the list of titles moves in the opposite direction of the cursor. By moving the list of titles this way, more titles can be displayed on a small screen and the user does not need not to use a scroll bar to view additional titles.

Figure 4:
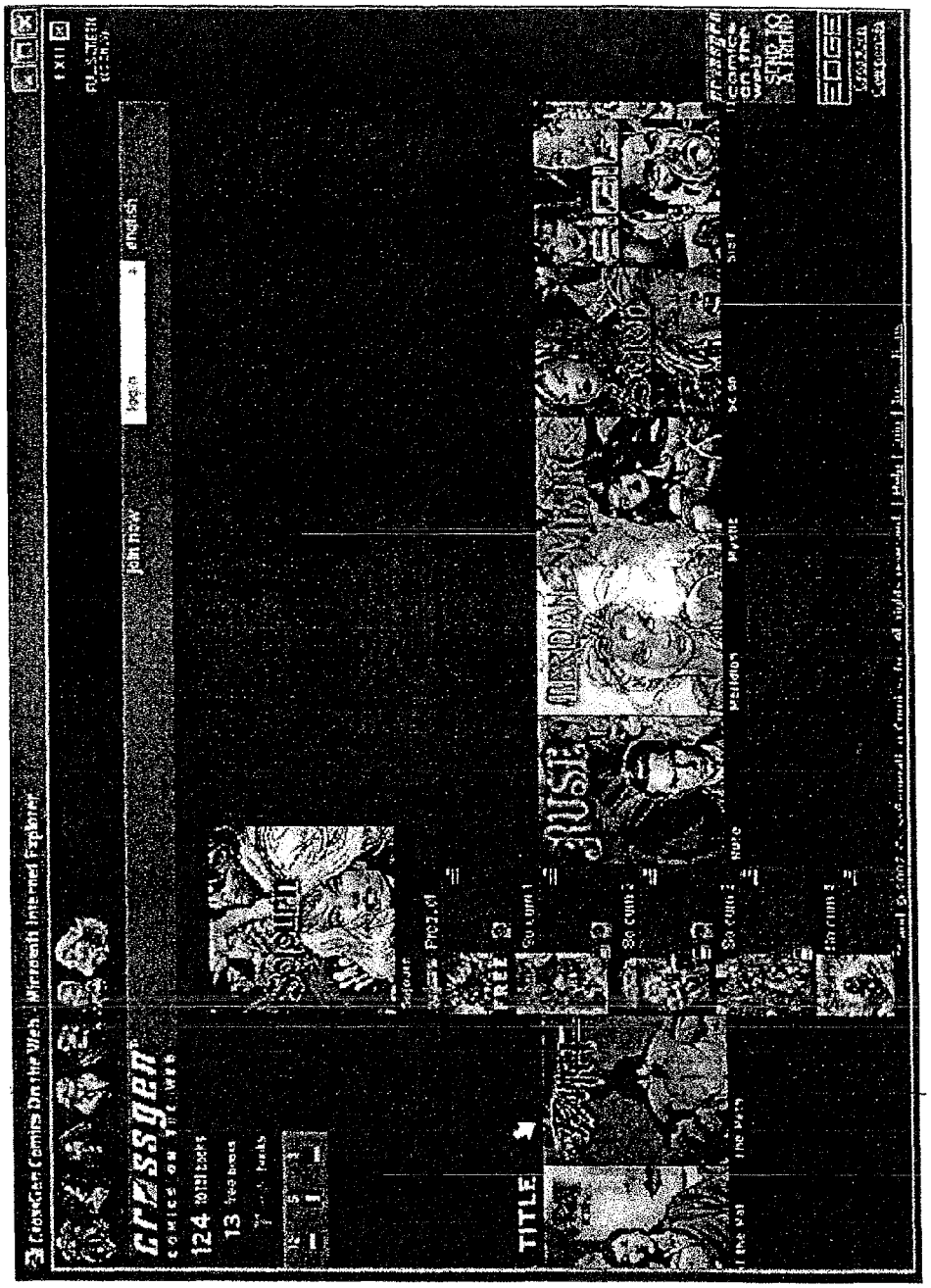
FIG. 4 shows a title selection screen displayed in one embodiment of the invention.

FIG. 4 illustrates a title selection screen 400, from which the user selects one of the titles. After the user selects one of the titles, all the available volumes of that title are displayed vertically 402. The user can then proceed to select a desired volume. For non-subscribers, only few volumes may be available for viewing, while the subscribers may view all the volumes.

Figure 5:
FIG. 5 shows an introductory display screen displayed in one embodiment of the invention.

FIG. 5 illustrates an introductory display screen 500. The introductory display screen 500 presents the title of the volume selected to the user and briefly instructs basic commands to the user. The introductory display screen 500 presents several help balloons 502 to the user. It also has a display feature bar 504 and an information bar 506. The help balloons 502 will disappear after the user clicks the cursor anywhere on the introductory display screen.

The display screen may have a control bar (not shown) that expands itself when a cursor moves on the top of the control bar. Besides expanding itself the control bar also moves to the left or to the right of the display screen depending the cursor's movement.

Figure 6:
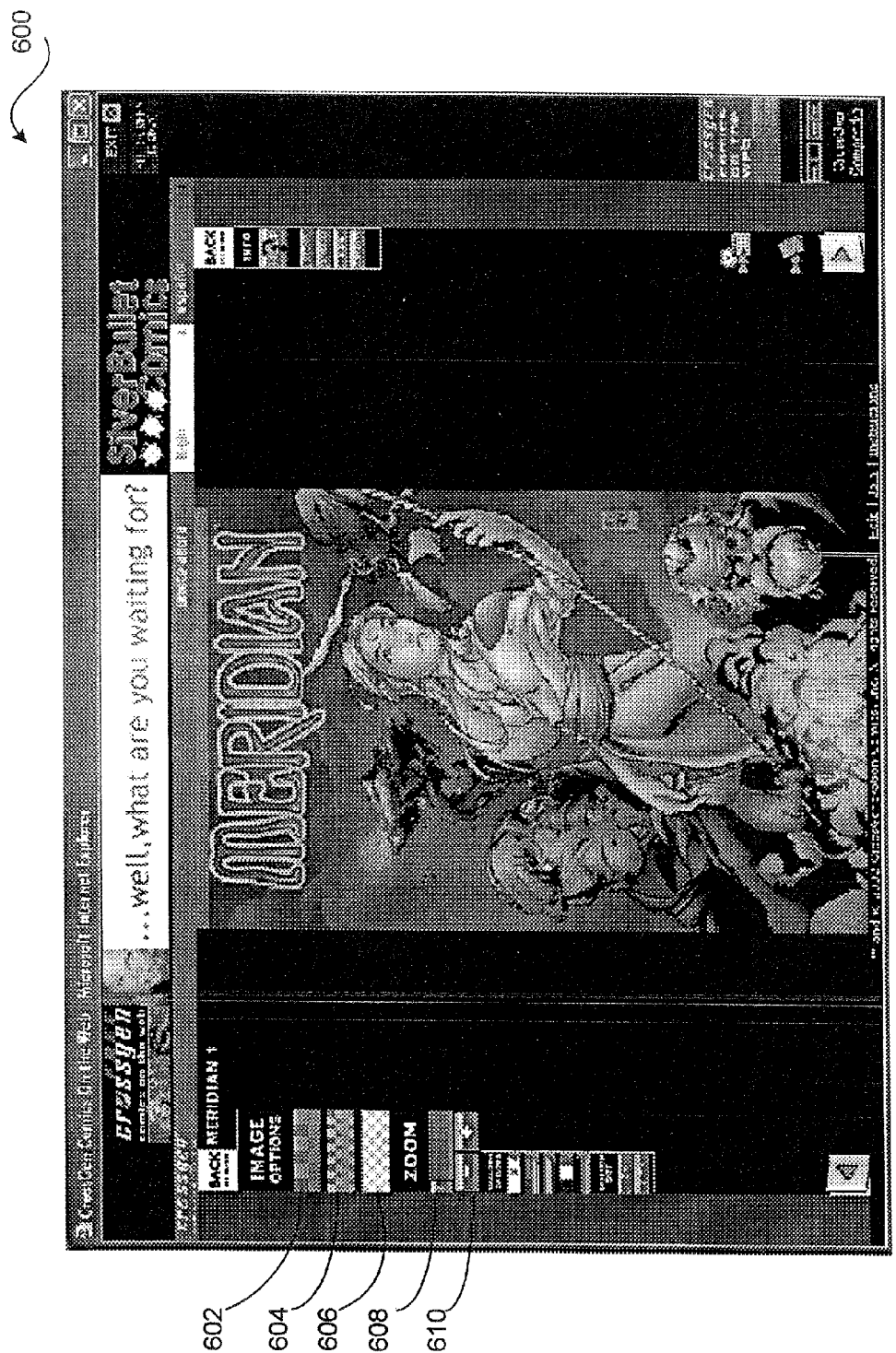
FIG. 6 shows a plurality feature buttons on the introductory display screen displayed in one embodiment of the invention.
Figure 7:
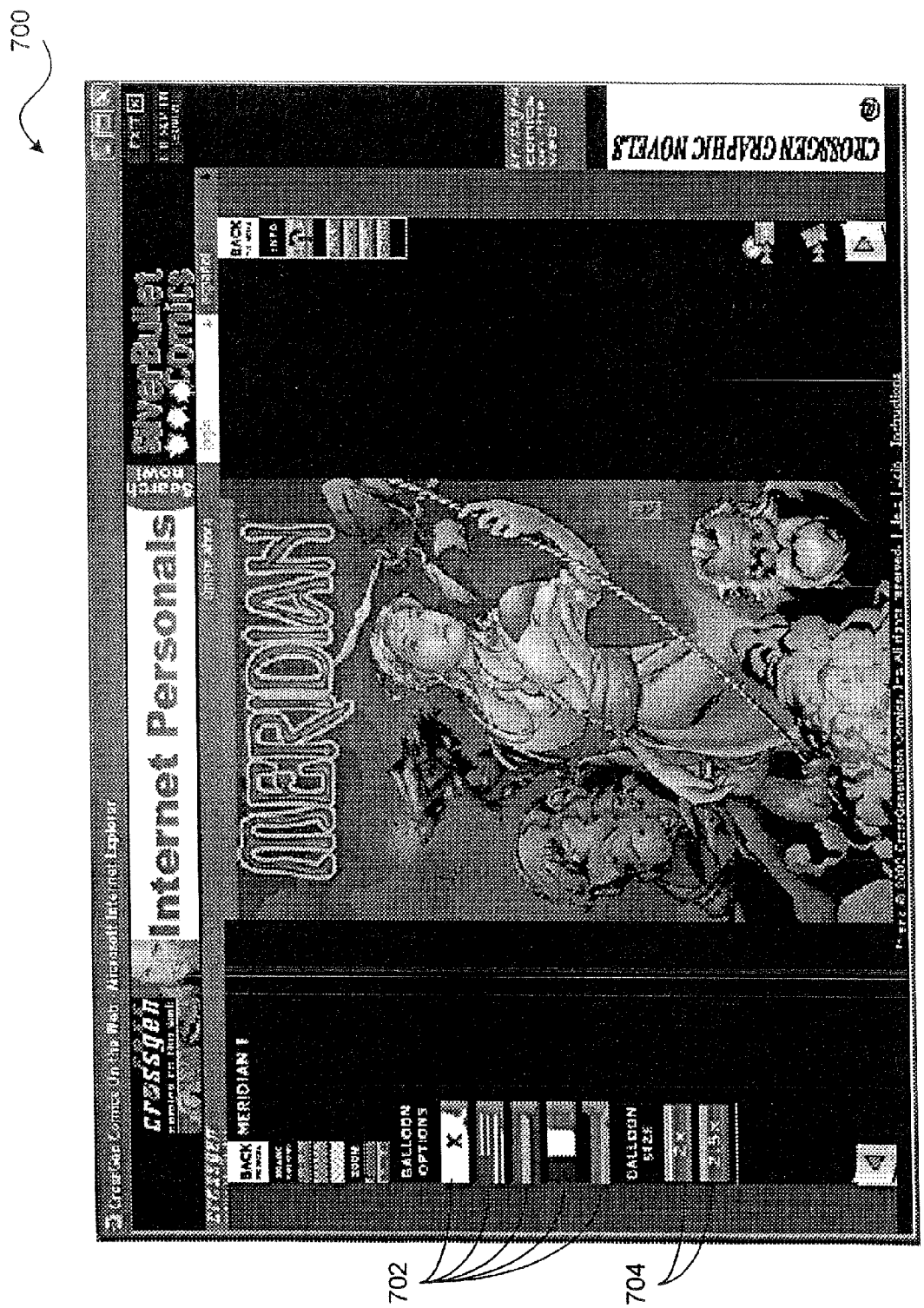
FIG. 7 shows a second set of feature buttons on the introductory display screen displayed in one embodiment of the invention.

The feature bar 504 also presents several features buttons 602-610 to the user. The user can adjust his digital information reading experience using these feature buttons as shown in FIG. 6. The feature buttons 602-610 control image quality of the digital information in display. The user may change the graphic display to a high-resolution image, a low-resolution image, or a black-and-white image by activating feature buttons 602, 604, or 606 respectively. When the user changes the image quality, the underline image does not change. A layer of the selected quality is lay on the top of the image. The user may also zoom in or out of the display image by using "+" or "−" buttons 610. The user may also zoom in or out by using the sliding button 608.

The feature bar 504 also presents a second set of feature buttons 702 and 704 that allow the user to change appearance of dialog balloons. The user may change the size of the dialog balloons through buttons 704, and he may also change the content of dialog from one language to another by selecting the desired languages through buttons 702. The dialog balloons are not drawn into the image. The dialog balloons are laid on top of the images, and they can be substituted freely by dialog balloons with different languages. In an alternative embodiment, not show in figures, the user may modify the expansion speed of the dialog balloons.

Figure 8:
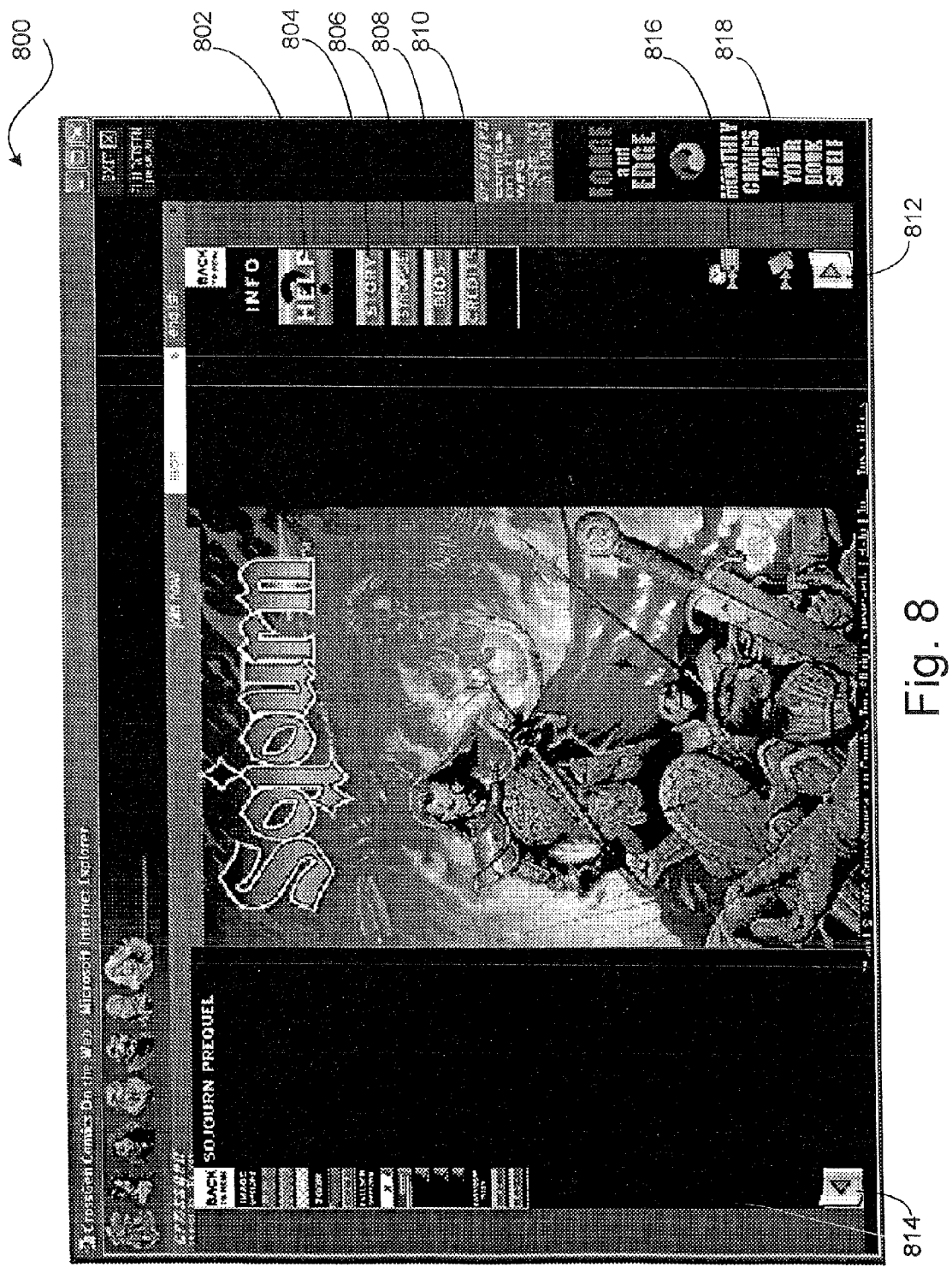
FIG. 8 shows an information bar on the introductory display screen displayed in one embodiment of the invention.

The information bar 506 has several feature buttons 802-810, as shown in FIG. 8, that provides help and information about the digital information that is being displayed. If the user activates the help button 802, help balloons 502 will be displayed. The user can learn about the story of the digital information in display up to that moment by activating the story feature button 804, and a story balloon will be displayed. The user can also learn about the summary of the selected story through a synopsis feature button 806 or the user can learn about the characters in the selected story through a character biography button 808. Finally, the user can learn about the creators of the comic story by activating a credits button 810.

On each screen there is one right navigation button 812 and one left navigation button 814 that let the user move the story forward and backward respectively. When the user activates right navigation button 812, a new page of digital information is loaded. Generally, the system buffers only two pages of digital information ahead of what is being displayed. For example, if the system is displaying page 3, then the system buffers pages 4 and 5. When the user moves the display to page 4, page 6 is loaded into the buffer. This way the use of the buffer is limited and time spent on file transfer is reduced. The user may also move to the next book of the same title by using button 818, or move to the next book by the release date by using button 816.

Figure 9:
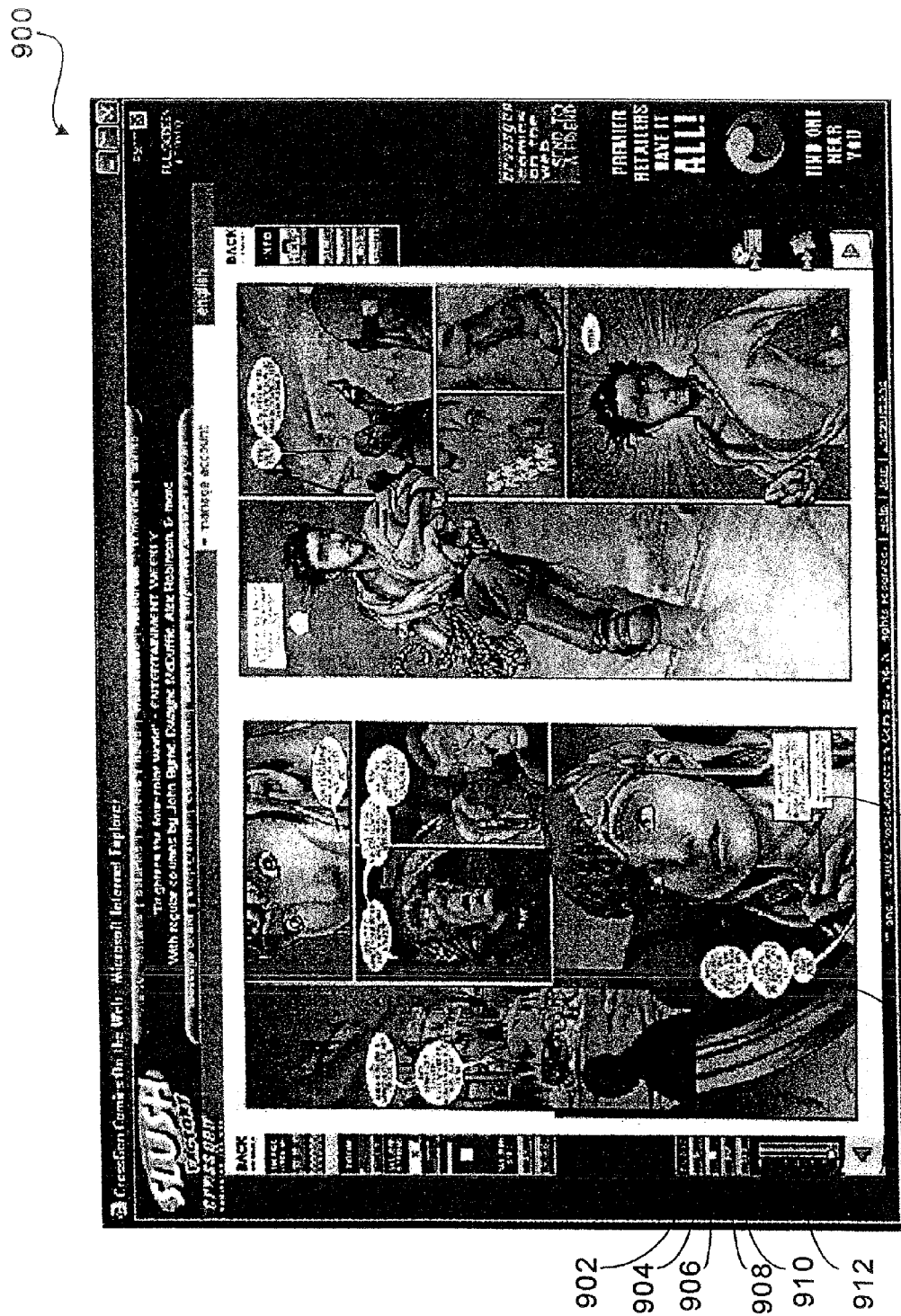
FIG. 9 shows a story display screen displayed in one embodiment of the invention.

The user may also choose to listen to the dialogs narrated instead of reading it by enabling an audio selection bar 902 shown in FIG. 9. When this audio feature is enabled, the user may play the audio files on an audio device, for example a speaker, by activating button 904 or stop the audio by activating button 906. The user may also set the audio to play automatically all the dialogs of the current display by enabling button 908. The digital information in display will automatically turn to the next page if the user enables button 910, which automatically turns the page when the audio is done. The audio file is a pre-recorded by actors playing the characters. The sliding bar 912 shows the loading of the audio file and the percentage of audio file played so far.

FIG. 9 also illustrates dialog balloons 914 and description boxes 916. The dialog balloons 914, which display text detail images, reflect the words spoken by a particular character in the story, and the description boxes 916, which also display text detail images, provide a background description of the story at that moment. Both dialog balloons and description boxes can alter their appearance when a cursor is placed on the top of them. The dialog balloons 914 and the description boxes 916 are placed as layers on the top of the display screen independently from the underlining pictorial display. When a cursor is placed on the top of a dialog balloon, the same dialog balloon is displayed at a bigger scale on the top of the display screen without affecting the underlining pictorial display, thereby facilitating easy reading of the dialog.

Figure 10:
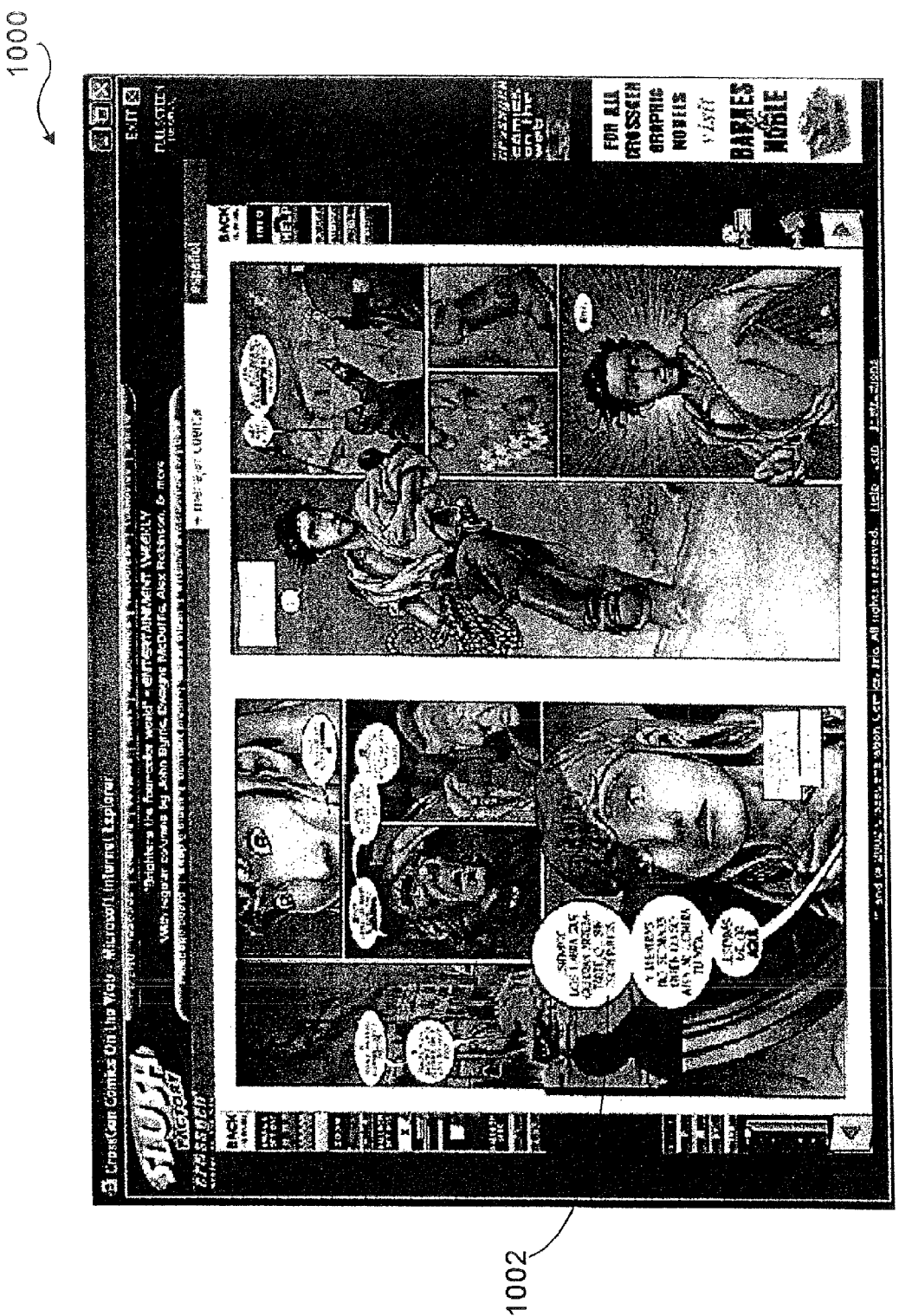
FIG. 10 shows a second view of the story display screen show in FIG. 9.

FIG. 10 illustrates a magnified dialog balloon. When the user rolls the cursor on the top of a dialog balloon, the selected balloon 1002 automatically magnifies its size to provide easy reading to the user without the user clicking the mouse. The user can select the size of the expanded dialog balloon through buttons 704. The expanded dialog balloon 1002 also illustrates the dialog may be changed from English to another language, in this case Spanish. The user may select different language for the dialog balloons using the language button 304. When the user changes the language selection from English to French through a language button on the control bar, all the dialog balloons and descriptions are changed to French. The user can mix the audio feature and the language feature. The user can read dialogs in English while listening the same dialog in French.

For example, the user can select one comic book from a selection of several titles by clicking on the selected title. After selecting a comic story, the user can select an image quality for viewing the comic story by using the feature buttons 602-606 on the display feature bar 504. He can select low quality through feature button 602 or high quality through feature button 604. He may also choose to view the comic book in basic ink quality through feature button 606. The image quality affects the information downloading speed. The high quality may require a larger file and longer downloading time. After setting the viewing quality, the cover page of the selected story is downloaded from the server 102 to the user's computer 104. The cover of the comic book is displayed along with help balloons 502. The help balloons 502 are in the format of dialog balloons pointing to different display areas and command buttons.

After activating the right navigation button 812, the system presents the inside cover and the first page to the user. The inside cover may contain advertisements and links to the advertiser's Internet site. The comic story may be displayed as two pages on each display screen: the left page and the right page. The display screen can also be used as single display page when needed.

When the user activates the right navigation button 812 to move to the next page, the system request additional pages to be downloaded from the server 102. For example, when the user moves to pages 3 and 4, the system requests the digital information for pages 5 and 6 be downloaded from the server. Other subsequent pages, such as pages 7 and 8 are not downloaded until pages 5 and 6 are displayed. This downloading scheme eases the network traffic and avoids long waiting time for the user.

There are several files that are downloaded from the server for a given page. In one embodiment, there is a black-and-white file (also known as ink file), a color file, a description file, dialog files, and an audio dialog file. There may be several dialog files, one for each language supported. These files are displayed independently onto the display screen. When the user is viewing the story in the black-and-white mode, the color file is not displayed. When the user is reading in English, the French dialog file will not be displayed.

The invention is also suitable for displaying other information. In one alternative embodiment, the present invention is used to display technical manuals for technicians, such as at an auto repair facility. The technical manuals can be loaded on the computer from a computer readable disk. A technician can select a vehicle model, for example, Ford Taurus, model year 2000. After selecting the vehicle model and the model year, the technician can select a particular technical area, for example the engine. Several aspects of the engine can be displayed in different pages on the display screen and the user can navigate through them by using the navigation buttons. On each page, there may be description boxes providing general description, and there may also be detail-displaying balloons, which are similar to dialog balloons, displaying details of a particular component. The detail-displaying balloon may be expanded to provide further detail and the detail-displaying balloon may also be expanded to provide an exploded view of the component or a rotating view of the component.

If, for example, the technician is from located in a Spanish-speaking country, then he can change the language to Spanish for ease understanding. The technician may also use the information bar features to learn more about a particular component. For example, the information bar may allow the technician to learn exact tuning criteria for the engine operating in idle or to learn an equivalent replacement part. The technician may also use the audio bar 902 to assist his work. The manufacturer of the technical manuals may include audio files for sound bites of an engine with incorrect timing or tuning as the way to help the technicians to properly identify the problem areas.

Figure 11:
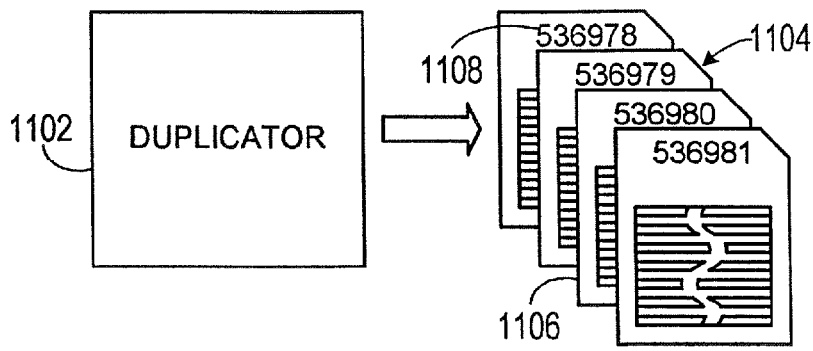
FIG. 11 is a block diagram of a duplicator and a plurality of portable digital storage media.

As shown in FIG. 11 is a method of publishing creative content in which creative content is copied onto a plurality of portable digital storage media 1104 using a duplicator 1102, such as a computer. The portable digital storage media 1104 could include many types of digital storage devices 1106, such as flash memory cards, memory sticks, micro disks, CD-read only memories; DVD's, etc. Typically, each digital storage device 1106 would include an identifying number 1108, such as a serial number or access code, printed thereon.

Figure 12:
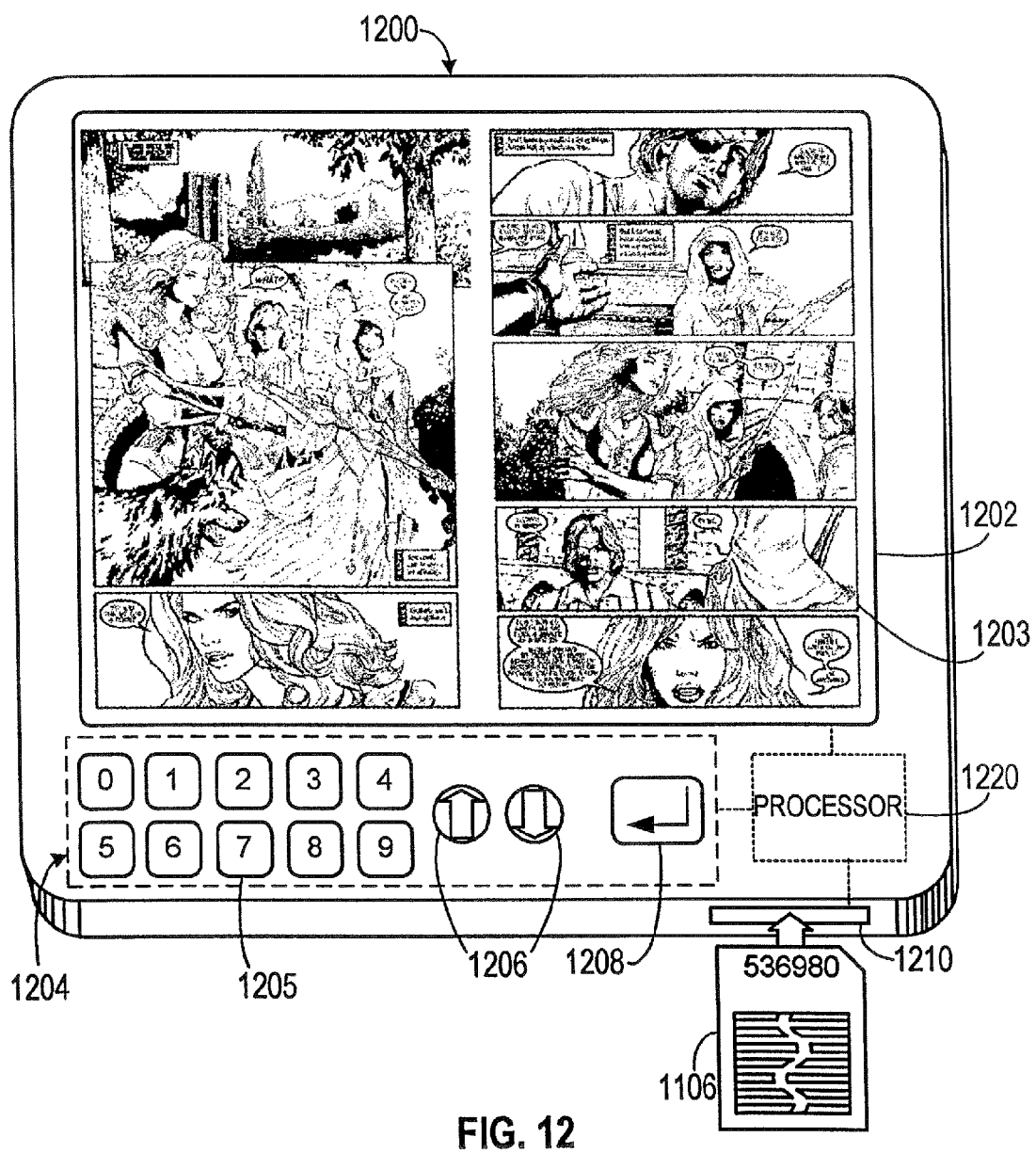
FIG. 12 is a perspective view of a local digital display device.

A video monitor 1200, such as a digital or computer display, of the type that would typically be used by a viewer of the creative content 1203, is shown in FIG. 12. The video monitor 1200 could be in the form of a tablet personal computer (PC), a laptop PC, a desk top PC, or any device capable of displaying graphic images. The video monitor 1200 includes a screen 1202 upon which the creative content 1203 is displayed. The video monitor 1200 would also typically include a user interface 1204 that enables the user to input information. The user interface would typically include some sort of information input keypad 1205 or keyboard, a page up/page down input 1206 and an enter key 1208. The video monitor 1200 would also include a portable digital data device reader port 1210 that is capable of receiving therein and reading a portable digital storage device 1106. Typically, all functions of the video monitor are controlled by a programmable processor, such as a microprocessor, a microcontroller, or the like. As shown in FIG. 12, the creative content 1203 could include a graphic novel.

A first unit of the creative content is stored on a first portable digital storage medium in an encrypted format, the first unit is encrypted with a selected one of a plurality of private encryption keys. The first portable digital storage medium is transferred to the local digital display device. A preselected public key is entered into the local digital display device. The preselected public key corresponds to the selected one of the plurality of private encryption keys. At least a portion of the first unit of the creative content is decrypted by employing the public encryption key using a public key/private key decryption algorithm. The portion of the creative content is displayed on the local digital display device.

Figure 13:
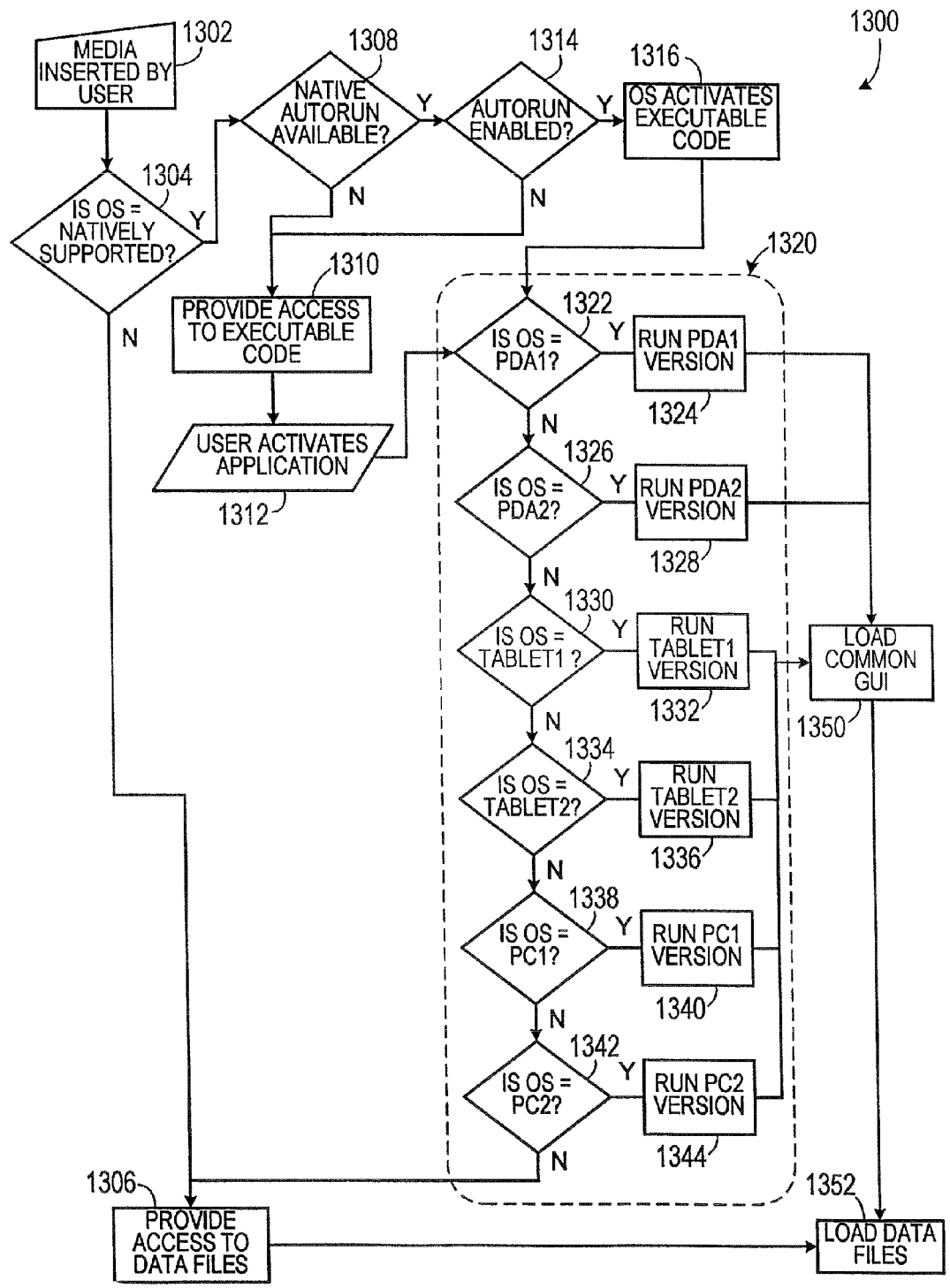
FIG. 13 is a flow chart showing operation of one embodiment of the invention.

As shown in FIG. 13, the operations 1300 executed in reviewing the creative content are commenced by the use inserting the portable digital storage medium into the portable digital data device reader port. The processor first determines if the operating system of the video monitor is natively supported 1304 by the portable digital storage medium. If not, then the user is allowed access to the data files 1306 and must locally configure the portable digital storage medium to display the creative content. If the operating system is natively supported, then the processor determines 1308 if the video monitor has a native ability to display the creative content automatically (i.e., does the video monitor support "auto-run"?). The portable digital storage medium may be configured to run in an autorun mode, or to run in a user-initiated run mode. If not, access to the executable code is provided 1310 and the user must manually activate the application 1312. If the video monitor does support autorun, then the processor determines 1314 is autorun is currently enabled by the video monitor. If not, then access to the executable code is provided 1310 and the user must initiate the application 1312. If autorun is enabled, then the operating system activates the executable code 1316.

Upon execution of the executable code 1316, a wrapper module 1320 is executed for whichever operating system is used. For example, if the processor determines 1322 that the operating system corresponds to a first type of personal data assistant (PDA), then a copy of the data corresponding to the first type of PDA is loaded and run 1324. Similarly, if the processor detects a second type of PDA 1326, then a copy of the data corresponding to the second type of PDA is run 1328. On the other hand, if a first type of tablet personal computer (PC) is detected 1330 the system loads and runs a copy of the data corresponding to the first type of tablet PC 1332. Similarly, a second type of tablet PC could be detected 1334, resulting in data corresponding to the operating system for the second type of tablet PC being run 1336. A first type of desk top PC operating could be detected 1338, and the copy of the data corresponding to the first type of desk top PC would be run 1340. A second type of desk top PC operating could be detected 1342, and the copy of the data corresponding to the second type of desk top PC would be run 1344. Once the correct copy of the data corresponding to the operating system of the video display device is run, a common graphic user interface is laded 1350 and then the data files corresponding to the creative content are loaded 1352.

Figure 14:
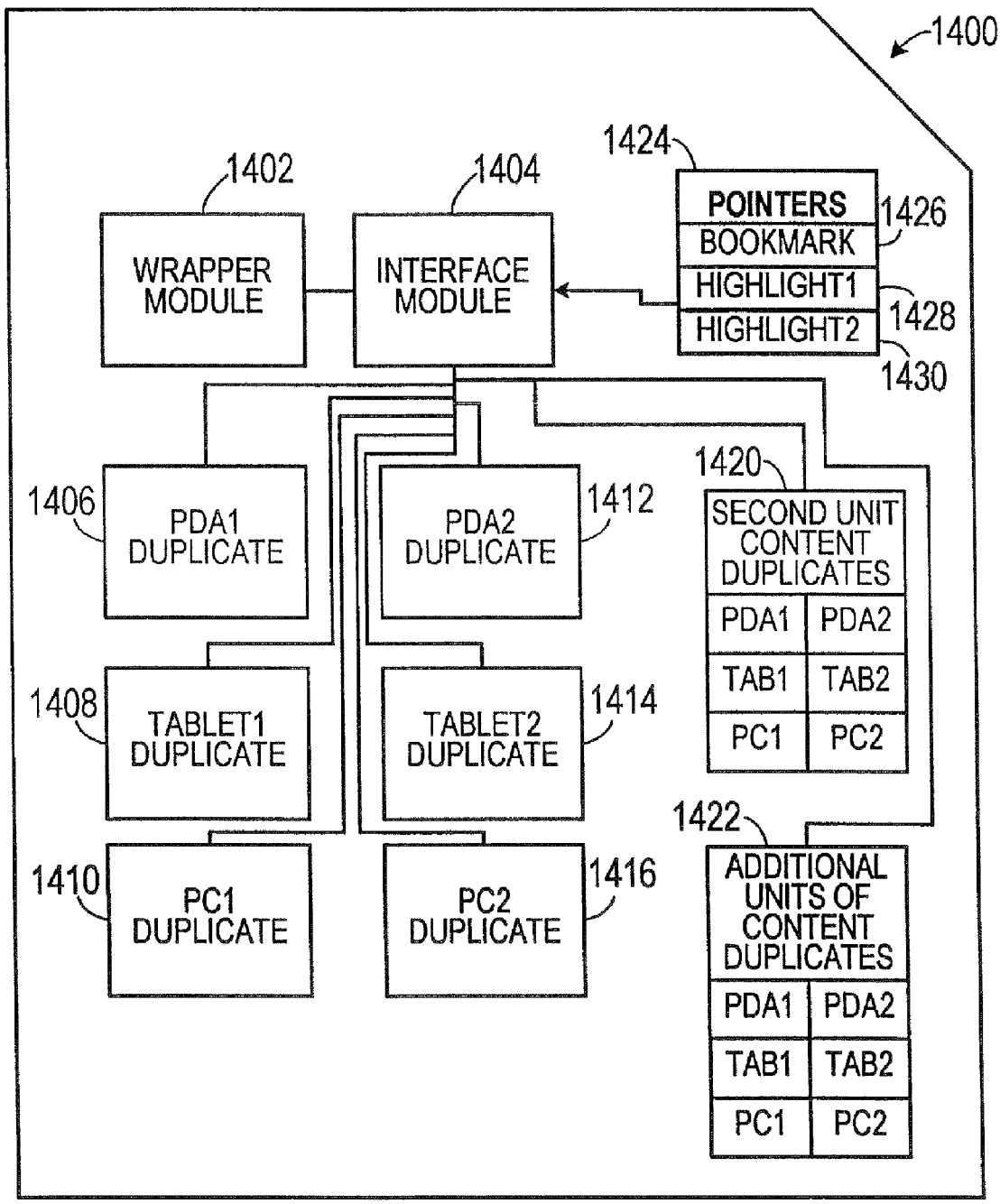
FIG. 14 is a memory diagram showing, in a generalized manner, a plurality of memory units stored on a portable digital storage medium according to one embodiment of the invention.

A typical portable digital storage medium 1400 is shown in FIG. 14. The memory of the digital storage medium 1400 would store the wrapper module 1402 and an interface module 1404 that includes the code that supports the common graphic user interface that that moves content-related data from the memory to the video display device. The digital storage medium would also include copies of the executable code and data corresponding to the various supported operating systems. These could include, for example, a duplicate of the code corresponding to a first PDA 1406, a second PDA 1412, a first tablet PC 1408, a second tablet PC 1414, a first desktop PC 1410 and a second desktop PC 1416. The creative executable code and data are made accessible when the user enters a public key, such as a code printed on the external surface of the digital storage medium. Each digital replication of the creative content is encrypted using a public key/private key decryption algorithm, in which a predetermined public key may be used to decrypt the digital replication.

The digital storage medium 1400 could also store a second unit of content duplicates 1420, which could be accessed by entering a key that may be subsequently purchased by the user. This allows the supplier to allow access to additional content modules without having to supply additional digital storage media. Additional units of content duplicates 1422 may also be stored on the digital storage medium 1400. Each additional unit of creative content is encrypted using the private key so that the additional unit of creative content may be decrypted using an additional symmetric key. A public key is printed on an external surface of the portable digital storage medium 1400. The public key corresponds to a private key used to encrypt the first unit of the creative content stored on the portable digital storage medium 1400.

Marking pointers 1424 may be stored on the digital storage medium 1400. A user interface 1204 may be used to indicate that a selected portion of the creative content is to be book-marked is received. A pointer 1426 to the selected portion is stored on the digital storage medium 1400. The selected portion may then be displayed in response to a request to go to a book-marked portion. Similarly, a user input may indicate that a selected range of text data, having a starting address and an ending address, is to be highlighted. A first highlight pointer 1428 to the starting address is stored and a second pointer 1430 to the ending address is also stored. When displaying content corresponding to the selected range of text data, the selected range of text data is displayed as being highlighted.

Figure 15:
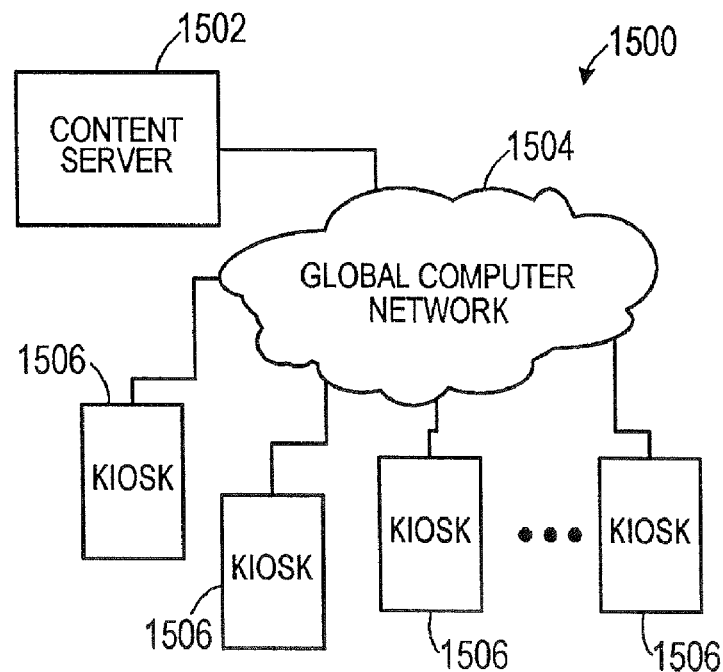
FIG. 15 is a network diagram of a kiosk system according to one embodiment of the invention.

As shown in FIG. 15, the invention lends itself well to a system 1500 in which content is distributed over a network of content kiosks 1506. A content server 1502 provides the creative content to the kiosks 1506 via a computer network, such as the global computer network 1504 (which could include the Internet).

Figure 16:
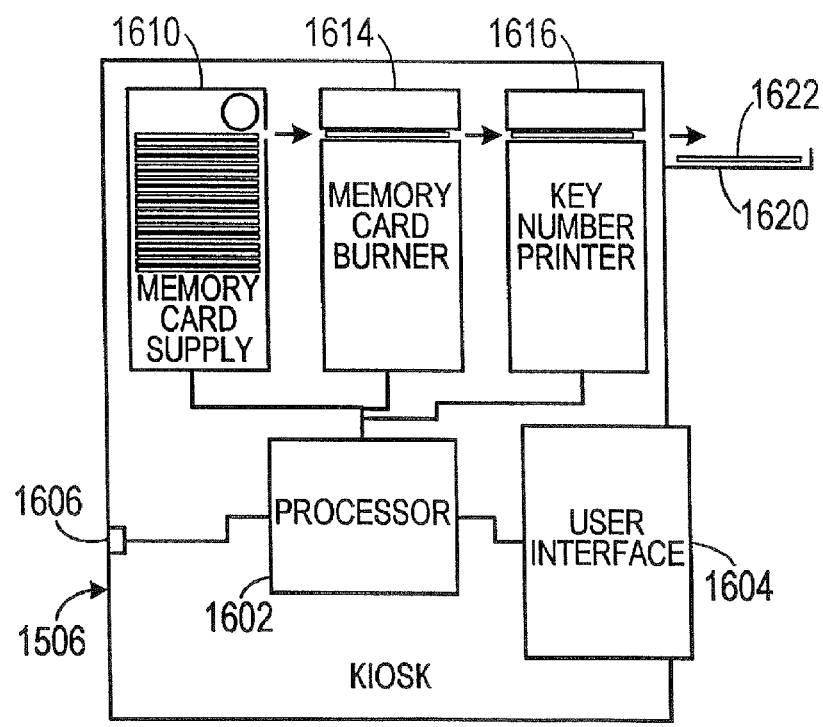
FIG. 16 is a block diagram of a kiosk memory card delivery unit according to one embodiment of the invention.

An exemplary kiosk 1506 is shown in FIG. 16. The kiosk 1506 communicates with the computer network through a network port 1606 and includes a processor 1602, which communicates with the user through a user interface 1604. The user interface 1604 could include a keypad and a credit card reader, or any one of the many interface devices used to enter identification, ordering and payment information commonly known. As shown herein, the processor 1602 includes all of the circuitry necessary to execute its functions, including memory and interface units. The processor 1602 controls the following devices: a memory card supply 1610, which has the capability of storing and disbursing memory cards; a memory card recorder 1614, which is capable of writing data to the memory cards; and a key number printer 1616, which is capable of printing a public key number on the memory card.

In operation, the user enters payment information and content selection through the user interface 1604. The processor 1602 sends a request for the selected content to the global computer network through the network port 1606. Upon receiving the content, the processor directs the memory card supply 1610 to supply a memory card 1622 to the memory card recorder 1614 and causes the memory card recorder 1614 to record the content on the memory card 1622. Upon completing the recording of the content, the memory card recorder 1614 delivers the memory card 1622 to the key number printer 1616. The processor 1602 then causes the key number printer 1616 to print a public key number, that will allow access to the content, on the exterior surface of the memory card 1622. The key number printer 1616 then delivers the memory card 1622 to a hopper 1620, from which the user may take the memory card 1622.

In one embodiment, the invention may employ a method of verifying authenticity of content stored on a portable digital storage medium. A profile may map of the portable digital storage medium may indicate that at least one preselected unit of memory is inaccessible. The preselected unit of memory may then be used to store data necessary for using the content. The data necessary for using the content is retrieved from the preselected unit of memory. Access to the content is allowed only when the data necessary for using the content is present in the preselected unit of memory. This would prevent unauthorized copying of the content. A physical defect may be created in the portable digital storage medium so as to make the preselected unit of memory inaccessible to a user during normal use of the portable digital storage medium.

To limit access to data on a portable data storage medium, a hashing index may be generated in which the data is hashed using a hashing algorithm employing the hashing index. This would generate hashed data. The hashing index is encrypted, thereby generating an encrypted hashing index. The hashed data and the encrypted hashing index are stored on the portable data storage medium. The portable data storage medium and a key to decrypt the encrypted hashing index are delivered to a user. The user may gain access to the data by inputting the key into a program for decrypting the encrypted hashing index and then de-hashing the data.

As used herein, portable digital storage media includes micro disks, flash, sd, cd-rom, dvd, etc.

The above-described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of publishing creative content to at least one local digital display device, comprising the steps of:
    storing a first unit of the creative content on a first portable digital storage medium in an encrypted format, the first unit of the creative content encrypted with a selected one of a plurality of private encryption keys;
    encrypting a second unit of creative content using the selected private key and storing the second unit of creative content on the first portable digital storage medium;
    transferring the first portable digital storage medium to the local digital display device;
    entering a preselected public key into the local digital display device, the preselected public key corresponding to the selected private key;
    decrypting at least a portion of the first unit of the creative content by employing the public key using a public key/private key decryption algorithm;
    decrypting at least a portion of the second unit of creative content using a second key different from the public key used to decrypt the first unit of creative content; and
    displaying at least one of the portion of the first unit of creative content and the second unit of creative content on the local digital display device.

2. The method of claim 1, wherein the second key is a symmetric key.

3. The method of claim 1, further comprising the step of printing a public key on an external surface of the portable digital storage medium, wherein the public key corresponds to a private key used to encrypt the first unit of the creative content stored on the portable digital storage medium.

4. The method of claim 1, further comprising the steps of storing on the portable digital storage medium a plurality of digital replications of the first unit of creative content, wherein each digital replication includes data that is operable under a different operating system.

5. The method of claim 4, further comprising the steps of:
(a) after execution of the transferring step, issuing a request for an operating system identification object;
(b) upon receipt of the operating system identification object, causing a digital replication from the portable digital storage medium corresponding to an operating system identified by the operating system identification object to be transferred to the local digital display device.

6. The method of claim 1, further comprising the steps of:
(a) receiving a user input indicating that a selected portion of the creative content is to be book-marked;
(b) storing a pointer to the selected portion; and (c) in response to a request to go to a book-marked portion, displaying the selected portion.

7. The method of claim 1, further comprising the steps of
(a) receiving a user input indicating that a selected range of text data, having a starting address and an ending address, is to be highlighted;
(b) storing a first highlight pointer to the starting address and a second pointer to the ending address; and
(c) when displaying content corresponding to the selected range of text data, displaying the selected range of text data as being highlighted.

8. The method of claim 1, further comprising the step of configuring the first portable digital storage medium to run in an autorun mode.

9. The method of claim 1, further comprising the step of configuring the first portable digital storage medium to run in a user-initiated run mode.

* * * * *